United States Patent

Lewis

[15] 3,638,528
[45] Feb. 1, 1972

[54] HYDRAULIC BOOST DEVICE WITH AUXILIARY FLUID SUPPLY

[72] Inventor: Richard L. Lewis, South Bend, Ind.
[73] Assignee: The Bendix Corporation
[22] Filed: June 17, 1970
[21] Appl. No.: 47,066

[52] U.S. Cl. .................................... 91/6, 60/51, 60/54.6 E
[51] Int. Cl. .......................................................... F01b 25/00
[58] Field of Search ........................ 60/51, 546 P, 52 B; 91/6

[56] References Cited

UNITED STATES PATENTS

| | | | |
|---|---|---|---|
| 3,353,451 | 11/1967 | Garrison et al. | 60/51 X |
| 3,131,538 | 5/1964 | Schultz et al. | 60/51 |
| 3,133,417 | 5/1964 | Hager | 60/51 |

*Primary Examiner*—Edgar W. Geoghegan
*Attorney*—Ken C. Decker and Plante, Hartz, Smith & Thompson

[57] ABSTRACT

A hydraulic brake booster is disclosed which provides a power assist to the vehicle operator during a brake application. Pressurized hydraulic fluid is supplied to the booster from the vehicle's power steering pump. A charging valve carried in the booster housing permits flow of fluid into an accumulator when the fluid pressure level at the booster inlet exceeds the fluid pressure level in the accumulator. When flow of fluid to the inlet is terminated the charging valve is opened during a brake application to permit flow of fluid from the accumulator to the booster thereby allowing normal operation of the booster for a limited number of brake applications.

13 Claims, 5 Drawing Figures

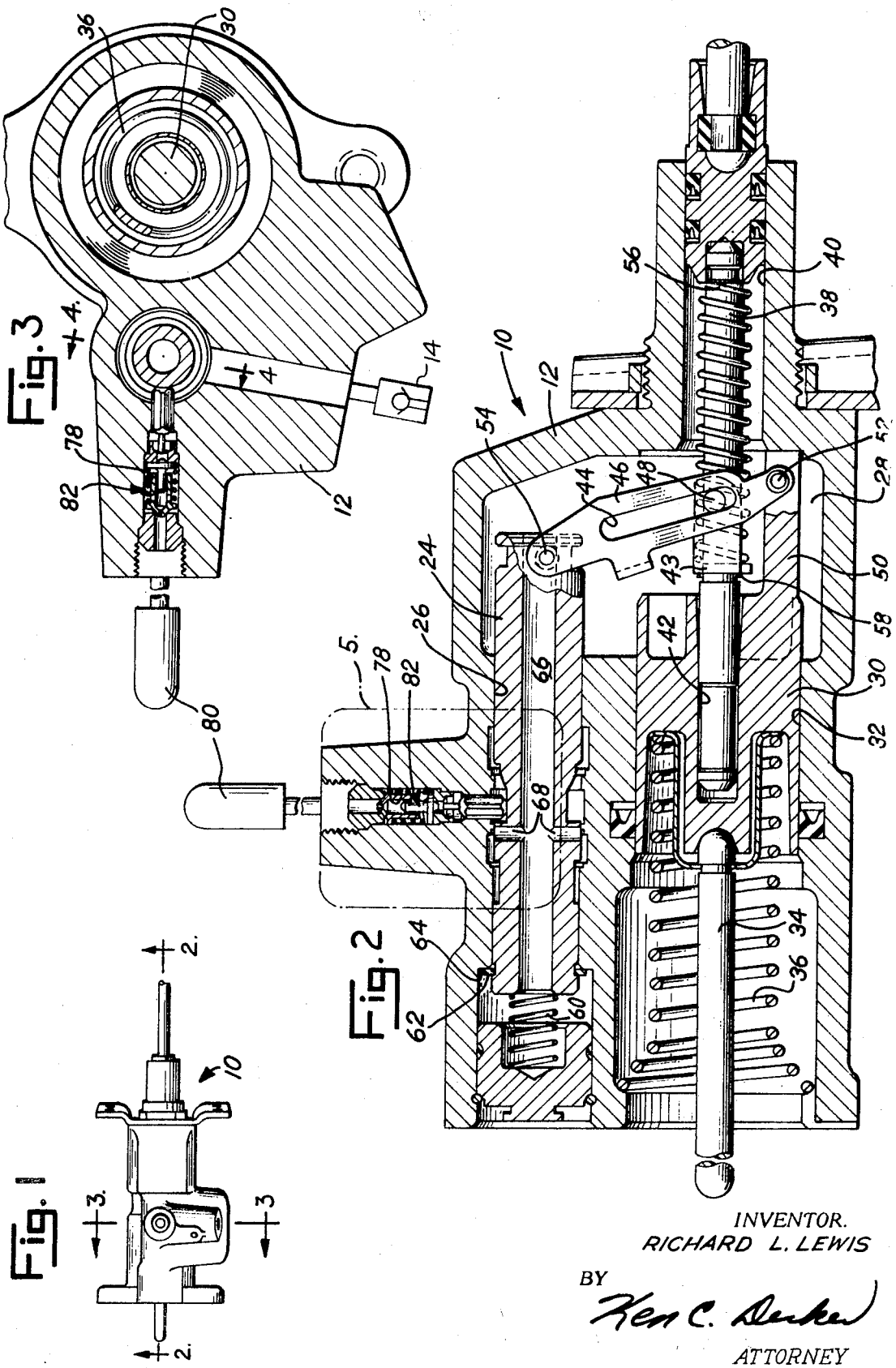

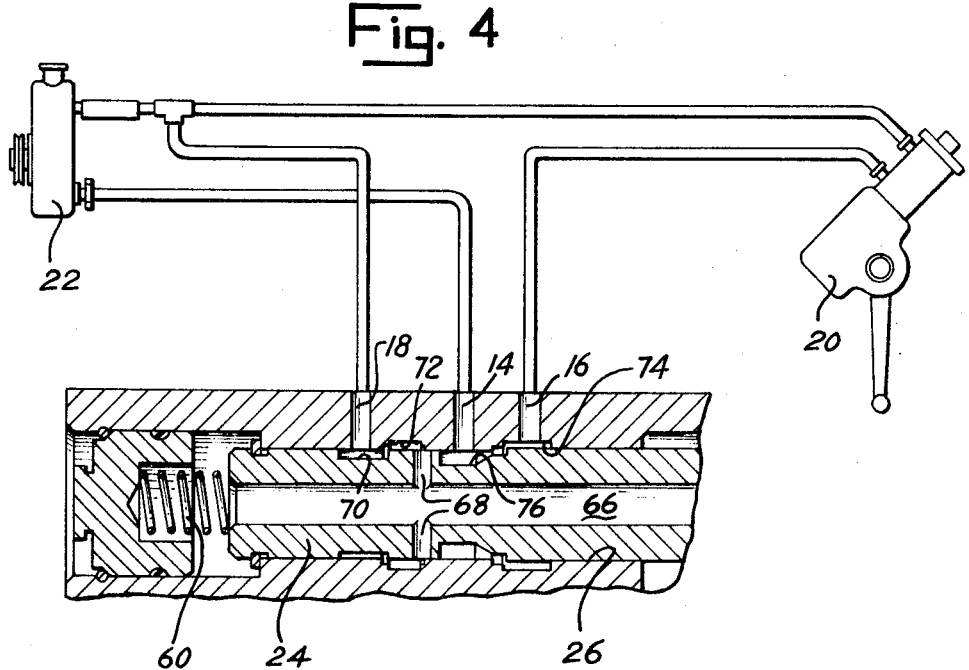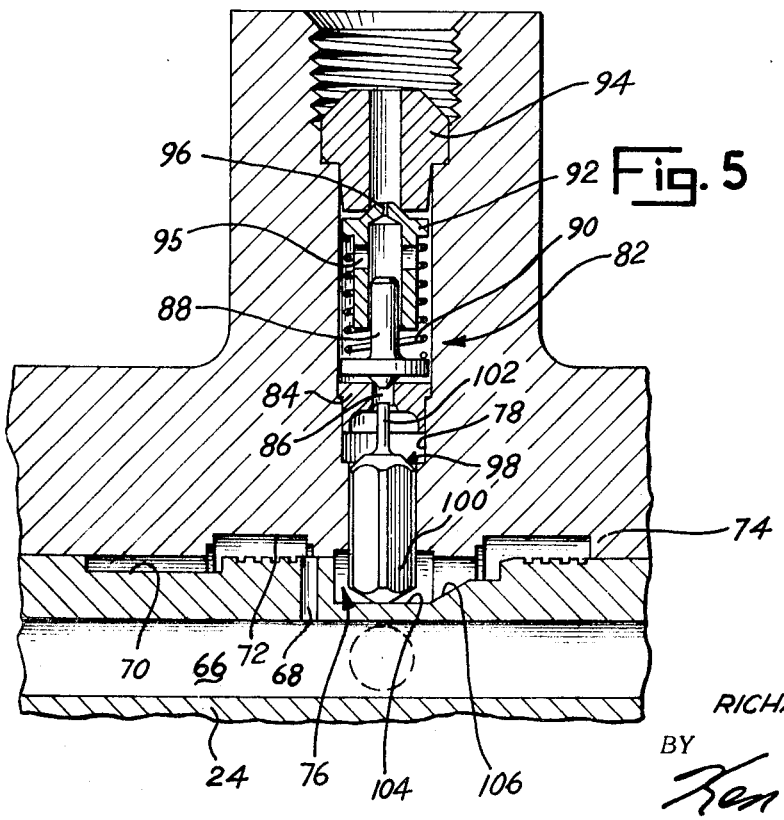

HYDRAULIC BOOST DEVICE WITH AUXILIARY FLUID SUPPLY

BACKGROUND OF THE INVENTION

This invention relates to a vehicle hydraulic system which includes a hydraulic brake booster.

Because of their smaller size and lower weight, hydraulic brake boosters are expected to be used in lieu of vacuum boosters in vehicles having power-assisted brakes. Such a device uses the pressurized fluid produced by the vehicle's power steering pump to provide a hydraulic assist to the vehicle operator when the brakes are applied. However, if a malfunction terminates flow of fluid to the booster, the power-braking assist is lost immediately and the vehicle operator must apply the brakes manually. Since existing vacuum boosters provide a vacuum reserve for a few brake applications after a power failure, vehicle operators expect some power reserve so that a power assist is provided even after the engine stops operating.

SUMMARY OF THE INVENTION

Therefore, an important object of my invention is to provide a fluid reserve for a hydraulic brake booster that can operate the latter even after the vehicle's engine ceases to operate or if a malfunction in the vehicle's hydraulic system terminates flow of fluid to the booster.

Another important object of my invention is to provide a charging valve that permits flow of fluid to the accumulator when the system is functioning normally and that permits flow of fluid from the accumulator to the booster when flow of fluid from the pump to the booster is terminated.

Another important object of my invention is to design a charging valve that may be installed within the booster housing.

A still further object of my invention is to furnish a charging valve that opens to permit flow of fluid from the accumulator to the booster when the valve that controls flow of fluid from the inlet of the booster into the working chamber thereof travels an abnormal distance.

BRIEF DESCRIPTION OF THE DRAWINGS

FIG. 1 is a top plan view of a brake booster made pursuant to the teachings of my present invention;

FIG. 2 is an enlarged longitudinal cross-sectional view taken along line 2—2 of FIG. 1;

FIG. 3 is an enlarged transverse cross-sectional view taken along line 3—3 of FIG. 1;

FIG. 4 is a longitudinal cross-sectional view taken along line 4—4 of FIG. 3 with portions of the hydraulic system shown schematically;

FIG. 5 is an enlarged, fragmentary view of that portion of my brake booster enclosed by the dashed lines in FIG. 2.

DETAILED DESCRIPTION

Referring now to the drawings, a brake booster 10 includes a housing 12 having an inlet port 14, an outlet port 16, and a return or exhaust port 18. The outlet port 16 is communicated to the inlet of a power steering gear 20, and the outlet port of the latter is communicated to the inlet of a power steering pump 22, as is the exhaust port 18, of the brake booster 10. The outlet of the pump 22 is communicated to the inlet port 14 of the booster 10. A spool valve 24 is slidable in a bore 26 and controls communication between the ports 14, 16 and 18 and a boost chamber 28, also within the housing 12. Details of the construction and operation of the valve 24 will be described hereinafter.

A boost piston 30 is slidable in a bore 32 within the housing 12. A rod 34 interconnects the piston 30 with a standard master cylinder (not shown) mounted on the left side of the housing 12. Movement of the piston 30 to the left viewing FIG. 2 develops pressure in the master cylinder in the normal manner for applying the vehicle's brakes. A return spring 36 yieldably urges the piston 30 to the right viewing FIG. 2, toward the brake release position.

An operator-operated control rod 38 is slidably mounted in yet another bore 40 within the housing 12. One end of the rod 38 is attached to the usual brake pedal (not shown) mounted in the vehicle operator's compartment. The other end of the rod 38 is slidably received in a blind bore 42 in the piston 30. The rod 38 extends through a stamping 43. The stamping 43 is pivotally mounted in slots 44 in a pair of levers 46 by pins 48. One end of the levers 46 is pivotally mounted to a bracket 50 mounted on the piston 30 by pivots 52, and the other end of the levers 46 are pivotally secured to the spool valve 24 as at 54. A spring 56 yieldably urges an abutment 58 on the rod 38 into engagement with the stamping 43 so that the rod and sleeve move together as a unit when the booster is functioning normally. The construction and operation of the piston 30, rod 38, stamping 43 and levers 46 is described in detail in copending U.S. application Ser. No. 35,800, filed May 8, 1970, owned by the assignee of the present invention and incorporated herein by reference.

The booster 10 illustrated in the drawings is shown in the brake release position. In this position, a spring 60 urges an abutment 62 on the spool valve 24 against a shoulder 64 on the housing 12. While the spool valve is so disposed, fluid in the chamber 28 is vented to the low-pressure side of the pump 22 through longitudinal passage 66 and radial passages 68 in the valve 24, grooves 70 and 72 in the valve 24 and housing 12 respectively, and the outlet port 18. Fluid flowing into the inlet 14 is communicated to the outlet 16 through groove 74 in the housing 12 and groove 76 in the spool valve 24. Flow of fluid from the inlet 14 to the chamber 28 is terminated while the spool valve is disposed in the brake release position since the fluid path between the groove 76 and groove 74 is blocked. Details of the construction and operation of the spool valve 24 are disclosed in copending U.S. Pat. application Ser. No. 13,415, filed Feb. 24, 1970, owned by the assignee of the present invention and incorporated herein by reference.

A second bore 78 is disposed perpendicularly to the bore 26, and one end of the bore 78 is in fluid communication with the groove 76. The bore 78 is disposed in substantially the same transverse plane as is the inlet port 14, but is circumferentially spaced from the latter. The other end of the bore 78 is in fluid communication with a fluid storage device or accumulator 80. The accumulator 80 may be of any suitable design well known to those skilled in the art, such as that disclosed in U.S. Pat. No. 3,282,786 owned by the assignee of the present invention and incorporated herein by reference. An accumulator charging valve, generally indicated at 82 is housed in the bore 78 for controlling flow of fluid between the accumulator 80 and the bore 26.

Charging valve 82 includes a circumferentially extending valve seat member 84 defining a passage 86 extending therethrough. A valve member 88 is yieldably urged into engagement with the valve seat 84 by a spring 90 to close the passage 86, thereby preventing flow of fluid through the valve 82. Spring 90 also urges a metering member 92 against a tube seat 94 which receives the conduit connecting the bore 78 to the accumulator 80. Metering member 92 includes a plurality of radially extending passages 95 and a restrictive orifice 96 that controls the volume of fluid flowing into the accumulator 80. A plunger 98 is slidably disposed in the lower part of the bore 78. Longitudinally extending channels 100 are provided in the plunger 98 to permit flow of fluid through the bore 78. A stem 102 projects from one end of the plunger 98 and extends through the passage 86 for engagement with the valve member 88 when the plunger is shifted upwardly in the bore 78. The other end of the plunger 98 slidably engages the spool valve 24. Valve 24 has a substantially constant diameter section 104 and a sloped section 106 of constantly increasing diameter, presenting a conical camming surface.

MODE OF OPERATION

FIGS. 2, 4, and 5 illustrate the position of the spool valve 24 when the vehicle's brakes are released. Assuming normal operation of the pump 22, fluid will flow into the inlet 14 and out of the outlet 16 to operate the power steering gear 22. A portion of the fluid flowing into the inlet will flow through the channels 100 on the plunger 88 and, if the pressure of the fluid at the inlet exceeds the fluid pressure in the accumulator 80 by an amount necessary to overcome the force of spring 95, fluid in the bore 78 will urge the valve member 88 off of the seat 86. Fluid will then flow past the valve 82, through the passages 95 and orifice 96, and into the accumulator 80 where it is stored for future use as will be hereinafter explained.

When the vehicle operator applies the vehicle's brakes, the control rod 38 is urged to the left viewing the figures. Since the rod 38 is connected to the levers 46 through the stamping 43, movement of the rod 38 will pivot the levers 40 about the pivots 52, thereby shifting the valve 24 to the left viewing the figures. As the valve 24 is shifted, fluid communication between the grooves 70 and 72 is terminated, thereby isolating the boost chamber 28 from the exhaust port 18. Simultaneously, flow of fluid is initiated from the groove 76 into the groove 72 and into the boost chamber 28 through the passages 68 and 66. The high-pressure fluid thereby admitted into the chamber 28 acts against the end of the piston 30, forcing the latter to the left viewing the figures to apply the vehicle's brakes. When the operator releases the brakes, springs 36 and 60 return the piston 30 and valve 24 to the brake release position illustrated in the figures.

As the valve 24 is shifted toward the position communicating fluid from the inlet 14 to the chamber 28, the plunger 98 remains in sliding engagement with the constant diameter section 104 of the valve 24, and therefore, does not move within the bore 78. However, should fluid communication be terminated to the inlet 14 because, for example, the vehicle engine ceases to operate, the valve 24 is shifted by the vehicle operator a small additional distance to engage the camming surface 106 with the bottom of the plunger 98, forcing the latter upwardly in the bore 78. As the plunger 98 is shifted, the stem 102 engages the valve member 88 to force the latter off of the seat 84. Fluid pressure in the accumulator then forces the member 92 away from the seat 94 to permit fluid to flow from the accumulator 80 into the groove 76, and from there into the chamber 28 through the grooves 76 and 72 and passages 68 and 66 to apply the brakes in the normal manner.

If the accumulator fluid supply is depleted, or if a malfunction in the valve mechanism 24 prevents movement of the latter, spring 56 yields when the vehicle operator depresses the brake pedal to permit the rod 38 to move relative to the lever 46, the abutment 58 moving away from the stamping 43. The end of the rod 38 engages the end of the blind bore 42 to provide a mechanical link between the master cylinder and the brake pedal, permitting the operator to apply the vehicle's brakes manually.

I claim:
1. In a vehicle hydraulic system:
a hydraulic boost device including a housing having an inlet, an outlet, a first bore communicating the inlet with the outlet, and a chamber in fluid communication with the inlet;
piston means shiftable in said chamber;
a pressure source in fluid communication with said inlet;
first valve means shiftable in said housing from a first position in which substantially all of the fluid flowing into the inlet is directed to the outlet toward a second position, said first valve means communicating successively higher fluid pressure levels into said chamber as the first valve means is shifted toward said second position;
operator-actuated means for actuating said first valve member;
means for storing fluid under pressure in fluid communication with said housing; and
second valve means for controlling fluid communication between the storage means and the chamber and shiftable from a first position in which flow of fluid from the storage means to the bore is prevented to a second position permitting fluid communication between the storage means and the bore;
said first valve means including means to shift said second valve means to its second position upon movement of the first valve means to its second position when fluid flow to said inlet is reduced.
2. The invention of claim 1:
said means to shift said second valve means including a camming surface on said first valve means; and
a plunger operably connected to said first and second valve means, said plunger being shifted by said camming surface to shift said second valve means to its second position.
3. The invention of claim 2:
said first valve means being shiftable within a first bore communicating the inlet with the outlet;
a member projecting into said bore slidably engaging said first valve means;
said member shifting said second valve means from its first position to its second position upon movement of the first valve means to its second position.
4. The invention of claim 2:
said first valve means being shiftable in a first bore within the housing communicating the inlet and outlet;
said housing defining a second bore therewithin in fluid communication with said first bore and with said fluid storage means;
said second valve means being housed in said second bore; and
means operatively engaging said first valve means for shifting said second valve means to its second position when said first valve means is moved to its first position.
5. The invention of claim 2:
said first valve means being shiftable in a first bore communicating the inlet with the outlet;
said housing defining a second bore therewithin in fluid communication with said first bore to communicate the inlet and with said fluid storage means;
said second valve means including a valve seat mounted in said second bore and a valve member yieldably urged into engagement with said valve seat to prevent flow of fluid between the storage means and the first bore, but moving from said seat to permit flow of fluid from the first bore to the storage means when the fluid pressure level at the inlet exceeds the fluid pressure level in the storage means; and
means operatively connecting said first valve means and said valve member for forcing the latter off said seat when the first valve means is shifted past its second position to permit flow of fluid from the accumulator to the bore.
6. The invention of claim 5:
said valve seat being annular to define a passage extending therethrough, said valve member being yieldably urged into a position closing said passage;
said connecting means being a plunger movable within said housing upon said movement of the first valve means to its second position.
7. The invention of claim 6:
said first valve means having a substantially constant diameter section and a tapered section presenting a camming surface extending from said constant diameter section;
said plunger slidably engaging said constant diameter section as said first valve means is shifted from said first position, said camming surfaces moving said plunger within said second bore to lift the valve member off the seat when said second valve means is shifted to its second position.
8. The invention of claim 6:

said plunger being slidable in said second bore and having a projecting portion extending through the passage defined by the valve seat for engagement with the valve member when the plunger is moved to lift the member off of the seat.

9. The invention of claim 8:

said plunger having channel means extending therethrough to permit flow of fluid through the plunger between the second valve means and said bore.

10. The invention of claim 5; and resilient means in said second bore yieldably urging said valve member against said valve seat.

11. The invention of claim 2; and a plunger movable in said housing for shifting said second valve means to its second position upon movement of the first valve means past its second position.

12. The invention of claim 11:

said first valve means having a substantially constant diameter section and a tapered section presenting a camming surface extending from said constant diameter section;

said plunger slidably engaging said constant diameter section when said first valve means is shifted from said first position, said camming surface moving said plunger within said second bore to shift said second valve means to its second position when said second valve means is shifted to its second position.

13. The invention of claim 11:

said plunger having channel means extending therethrough to permit flow of fluid through the plunger between the second valve means and said chamber.

* * * * *